United States Patent [19]

Kopp

[11] 4,270,490
[45] Jun. 2, 1981

[54] ANIMAL FEED BOWLS

[76] Inventor: Larry F. Kopp, P.O. Box 265, Tofino, British Columbia, Canada

[21] Appl. No.: 17,189

[22] Filed: Mar. 5, 1979

[51] Int. Cl.³ .............................................. A01K 5/00
[52] U.S. Cl. ........................................ 119/61; 220/4 B
[58] Field of Search ............................ 119/61, 63, 72; 220/4 B, 306

[56] References Cited

U.S. PATENT DOCUMENTS

| 797,314 | 8/1905 | Owens | 220/4 B |
|---|---|---|---|
| 1,693,150 | 11/1928 | Malonyay | 220/306 |
| 1,919,574 | 7/1933 | Schmidt | 220/306 |
| 3,355,061 | 11/1967 | Ritter | 220/306 |
| 3,527,374 | 9/1970 | Thor | 220/306 |
| 3,810,446 | 5/1974 | Kightlinger et al. | 119/61 |

FOREIGN PATENT DOCUMENTS 460878  2/1937  United Kingdom ..................... 220/306

Primary Examiner—Gene Mancene
Assistant Examiner—Robert P. Swiatek
Attorney, Agent, or Firm—Klarquist, Sparkman, Campbell, Leigh, Hall & Whinston

[57] ABSTRACT

A pair of animal feed bowls, one of which is for additionally acting as a cover for the other feed bowl is disclosed. Cooperating apparatus is provided on the two bowls for releasably securing one in an inverted position as a cover over the other. In one embodiment, a flexible peripheral side wall of the covering feed bowl is peripherally corrugated.

3 Claims, 4 Drawing Figures

ANIMAL FEED BOWLS

This invention relates generally to feed bowls for animals, and more particularly to a pair of animal feed bowls for holding and protecting food for animals.

Feed bowls for household animals such as dogs and cats come in many shapes and sizes. Often, a pet owner will purchase a feed bowl or bowls especially designed for pets, or he may use bowls which were originally put on the market with the thought that they would be used by humans at the dinner table. In either case, a pet will typically have two feed bowls, one for solid foods such as meat, and one for liquid foods such as water. There are some commercially available animal feed dishes which include two side-by-side bowls in an integral unit, one side to be used for solid food, the other side to be used for liquid food. However, as an integral unit, such side-by-side bowls may occupy a relatively large space which can be undesirable if, for example, the animal's food is to be stored for a period of time (as in a refrigerator).

From time to time an animal may not be willing to eat all the food which is placed before him. Rather than throw the food away, it is then often desirable to store the food until some future time when the animal's appetite returns. Similarly, it may be desirable to store prepared food in the animal's feed bowl in cases where the pet owner wishes to prepare the food ahead of time for subsequent feeding. For example, the owner may wish to prepare the animal's food before a trip and carry the prepared food for a ways during the trip. In such situations, it is desirable to have a protective covering for the bowl which will keep the food moist, fresh and sanitary. Typically, the protective covering will take the form of a foil or cellophane wrap, or perhaps merely a plate or other device which overlies the open end of the feed bowl. Foil or cellophane wrap can be awkward and inconvenient to use—and the cost can become significant over a period of time. A plate or other such device may be easily dislodged and is therefore not suitable in cases where the animal may be in a position to get at its feed bowl, or in cases where the feed bowl is being carried such as during travel.

An object of the present invention is to provide a pair of animal feed bowls in which one feed bowl when not in use may be releasably secured to the other feed bowl to provide a protective covering for food contained in the latter feed bowl, the two feed bowls when so combined occupying minimal storage space.

In accordance with the present invention, there is provided a pair of animal feed bowls for holding and protecting food for an animal, comprising first and second open end feed bowls. The first feed bowl includes a base, a peripheral rim at the open end of the feed bowl, and a peripheral side wall having an exterior surface extending upwardly from the base to the rim. The second feed bowl which is for additionally acting as a cover for the first feed bowl includes a bottom wall, and a flexible resilient peripheral side wall having an interior surface extending upwardly from the bottom wall to the open end of the second feed bowl. The bottom wall and the interior surface of the second feed bowl are shaped to permit the second feed bowl to be inverted and placed as a cover over the first feed bowl such that the bottom wall of the second feed bowl lies substantially flush with the rim of the first feed bowl to closely cover a substantial portion of the exterior surface of the first feed bowl. Further, the first and second feed bowls include cooperating means for releasably securing the second feed bowl in the inverted position as a cover over the first feed bowl.

Since the second feed bowl extends downwardly to cover a substantial portion of the exterior surface of the first feed bowl, it may readily be used as a feed bowl for carrying water or other food when not being used as a protective cover. Further, in the event that the second feed bowl when being used as a cover is not properly secured to the first feed bowl, or in the event that the second feed bowl inadvertently becomes unsecured from the first feed bowl, the extent to which the second feed bowl overlaps the first feed bowl (closely covering a substantial portion of the exterior surface of the first feed bowl) makes it less likely that the second feed bowl will be entirely dislodged from the first feed bowl.

The cooperating means for releasably securing the second feed bowl to the first feed bowl may comprise cooperating flange and flange engagement means. In a preferred embodiment, the cooperating means includes a flange forming an inwardly extending peripheral rim at the open end of the second feed bowl, and a plurality of wedge-shaped tabs disposed at spaced intervals on the exterior surface of the peripheral side wall of the first feed bowl. Each of the wedge-shaped tabs includes a lower end extending outwardly from the lower part of the exterior surface for engaging the underside of the flange to releasably secure the second feed bowl to the first feed bowl in the inverted position as a cover over the first feed bowl. The wedge-shaped tabs may be formed integrally with the first feed bowl. As the second feed bowl is placed as a cover over the first feed bowl, the tabs engage the inner perimeter of the flange forming the rim on the second feed bowl and, by reason of the flexibility in the peripheral side wall of the second feed bowl, tend to widen the open end of the second feed bowl until the flange reaches a level below the lower end of the tabs. Then, the underside of the flange resiliently slips beneath the tabs.

A pair of feed bowls in accordance with the present invention may be formed from various suitable materials. However, it is contemplated that plastic material will be preferred because it is durable and relatively inexpensive as well as easy to form. Depending upon the flexibility and resiliency of material used for the second feed bowl, a relatively tight fit may be achieved when the second feed bowl is releasably secured to the first feed bowl. To enable the second feed bowl to be easily unsecured from the first feed bowl, a portion of the outer surface of the peripheral side wall of the second feed bowl may be advantageously peripherally corrugated. This may be done without sacrificing support at the base of the side wall of the second feed bowl where it intersects with the bottom wall of the second feed bowl, by placing the corrugations substantially away from the bottom wall. With corrugations, the side wall of the second feed bowl can be more easily bent outwardly away from the side wall of the first feed bowl.

The general shape and configuration of a pair of feed bowls in accordance with the present invention are not considered crucial. The invention may be used with variously shaped bowls (e.g. generally circular, generally triangular, generally rectangular, etc.).

The invention will now be described with reference to the drawings in which.

Figure 1:
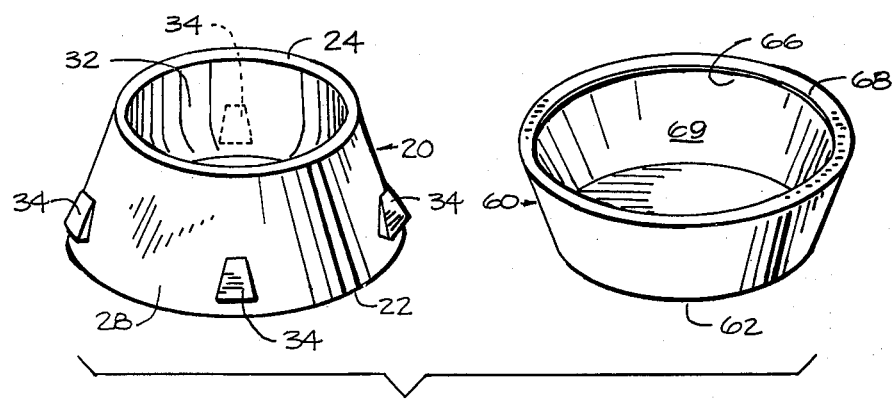
FIG. 1 is a perspective view of a pair of feed bowls in accordance with the present invention.
Figure 2:
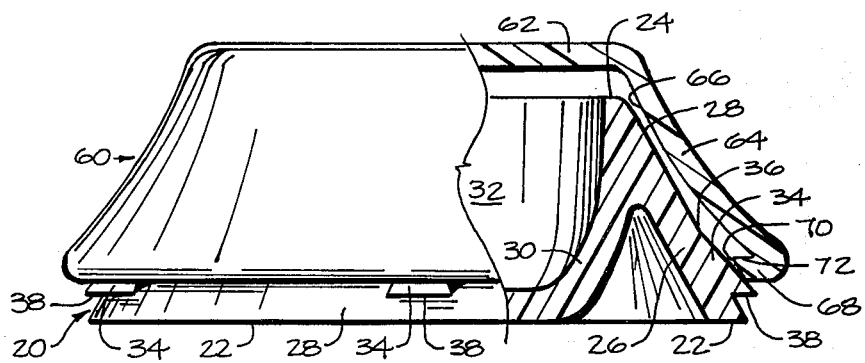
FIG. 2 is a plan view, partially cut away, showing one of the feed bowls of FIG. 1 partially in place as a cover over the other feed bowl of FIG. 1.
Figure 3:
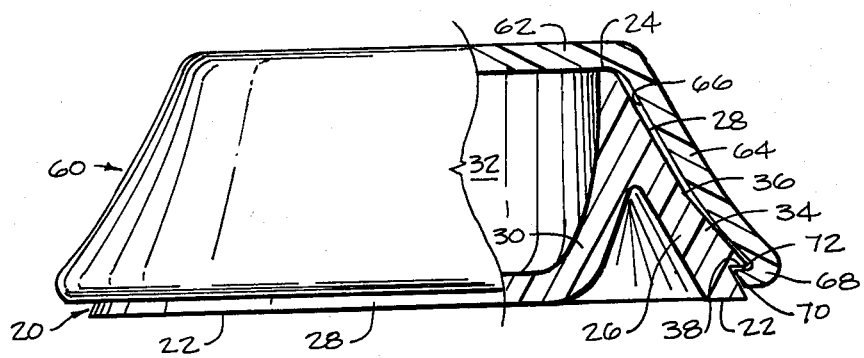
FIG. 3 is a plan view, partially cut away, showing one of the feed bowls of FIG. 1 fully in place as a cover over the other feed bowl of FIG. 1.

The pair of open end animal feed bowls generally designated 20 and 60 in FIGS. 1 to 3 cooperating such that feed bowl 60 may be used conventionally as a feed bowl (viz. in the upright position shown in FIG. 1), or as a secured cover over feed bowl 20 (viz. in the inverted position shown in FIG. 3).

Feed bowl 20 and feed bowl 60 each have a molded integral construction of plastic or other suitable material. The material of feed bowl 60 is flexible and resilient for reasons that will become apparent. The material of bowl 20 may be more rigid; however, it may also be the same as that of feed bowl 60. Obviously, where the same material is used for each bowl, there is no requirement for different raw materials.

Feed bowl 20 comprises a base 22, a peripheral rim 24 at its open end, and peripheral side wall 26 the exterior surface 28 of which extends upwardly from the base to the rim. A bowl-shaped wall 30 extends downwardly and inwardly from rim 24 and side wall 26 to form a bowl-shaped cavity 32 for holding food (not shown). Feed bowl 20 also includes a plurality of wedge-shaped tabs 34 integrally disposed at spaced intervals on exterior surface 28 of wall 26. As best shown in FIG. 1, four such tabs are provided, spaced in angular steps of 90° in a horizontal plane. The upper ends 36 of the tabs are substantially flush with exterior surface 28; their lower ends 38 extend outwardly from the lower part of exterior surface 28.

Feed bowl 60 comprises a bottom wall 62 and a peripheral side wall 64 having an interior surface 66 which extends upwardly from the bottom wall to the open end of the bowl. A flange 68 forms an inwardly extending peripheral rim at the open end of the bowl. In the upright position shown in FIG. 1, feed bowl 60 can serve its conventional function as a feed bowl, bottom wall 62 and interior surface 66 forming an interior cavity 69 for holding food (not shown). As best shown in FIGS. 2 and 3, bottom wall 62 and interior surface 66 are shaped to permit feed bowl 60 to be inverted from the upright position and placed as a cover over feed bowl 20.

When feed bowl 60 is fully in place as a cover over feed bowl 20 (as shown in FIG. 3), then bottom wall 62 of feed bowl 60 lies substantially flush with rim 24 of feed bowl 20. Also, interior surface 66 of feed bowl 60 extends downwardly towards base 22 of feed bowl 20, closely covering a substantial portion of exterior surface 28 of feed bowl 20.

FIGS. 2 and 3 illustrate the interaction of tabs 34 on feed bowl 20 and flange 68 on feed bowl 60 when feed bowl 60 is being placed in position and when it is fully in position as a cover over feed bowl 20. As feed bowl 60 is lowered in the inverted position over feed bowl 20, the inner periphery 70 of flange 68 eventually comes into contact with tabs 34. This is shown in the cut away side of FIG. 2. Further lowering of bowl 60 through the application of a downward force will then distend its open end due to the resulting generally horizontal force between tabs 34 and flange 68 and the flexible construction of bowl 60. The open end of bowl 60 continues to be distended until the underside 72 of flange 68 resiliently snaps below lower end 38 of tabs 34 into the position best illustrated in the cut away side of FIG. 3.

In the position shown in FIG. 3, bowl 60 is secured as a cover over bowl 20 by the interaction of tabs 34 and rim 68. Bowl 60 may be released from its secured position by bending side wall 64 away from bowl 20 such that rim 68 is carried from beneath the tabs, and at the same time applying an uplifting force on bowl 60.

Depending upon the flexibility and resilience of side wall 64, it can be more or less difficult to release bowl 60 from the secured position shown in FIG. 3. The ease with which wall 64 can be bent away from the secured position can be decreased or increased by decreasing or increasing the thickness of the wall. Obviously, flexibility and resilience of wall 64 can also be varied by altering the flexibility and resilience of material used in the manufacture of bowl 60.

Figure 4:
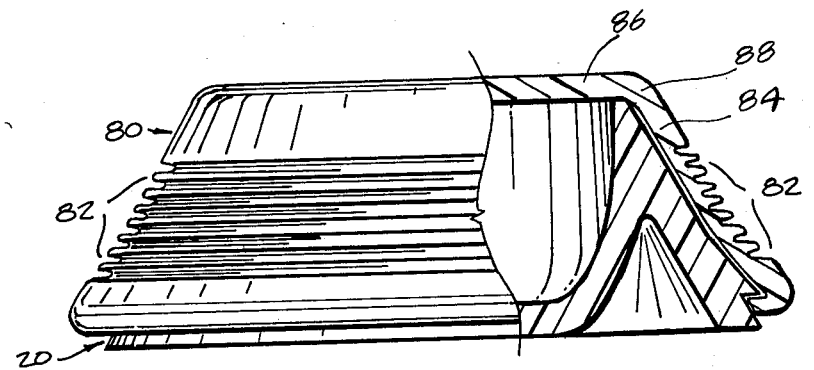
FIG. 4 is a plan view similar to FIG. 3, but showing peripheral corrugations on the side wall of the covering feed bowl.

A further technique for making the task of releasing bowl 60 from bowl 20 easier is illustrated in FIG. 4. FIG. 4 is similar to FIG. 3 except bowl 60 has been replaced by bowl 80, the basic difference between bowl 60 and bowl 80 being the added provision of peripheral corrugations 82 on bowl 80. Such peripheral corrugations provide a region of weakening in side wall 84 of bowl 80. The region of wall 84 where the corrugations appear is effectively thinned, but this is to be distinguished from simply making the wall uniformily thinner. Where only a portion of the wall is corrugated as shown in FIG. 4, relative rigidity is maintained around the base of the bowl where bottom wall 86 and side wall 84 intersect (as at peripheral corner 88 shown in FIG. 4). Thus, side wall 84 is relatively rigid at its base which is desirable for support purposes, but is relatively flexible at its top, thus enabling bowl 80 to be more easily released from the secured position over bowl 20.

Various modifications to the specific embodiments described above will occur to those skilled in the art without departing from the spirit and scope of the invention as set forth in the following claims.

I claim:

1. A pair of animal feed bowls for holding and protecting food for an animal, comprising:
   (a) a first open end feed bowl, comprising:
      (i) a base;
      (ii) a peripheral rim at said open end; and,
      (iii) a peripheral side wall having an exterior surface extending upwardly from said base to said rim;
   and,
   (b) a second open end feed bowl for additionally acting as a cover for said first feed bowl, comprising:
      (i) a bottom wall; and,
      (ii) a flexible resilient peripheral side wall having an interior surface extending upwardly from said bottom wall to the open end of said second feed bowl,
      the bottom wall and interior surface of said second feed bowl being shaped to permit said second feed bowl to be inverted and placed as a closely covering cover over said first feed bowl, such that the bottom wall of said second feed bowl lies substantially flush with the rim of said first feed bowl, and the interior surface of said second feed bowl extends downwardly towards the base of said first feed bowl closely covering a substantial portion of the exterior surface of said first feed bowl; and, (c) cooperating means on said first and second feed bowls for releasably securing said second feed bowl in said inverted position as a closely covering cover over said first feed bowl, said cooperating means comprising:
  (i) a flange forming an inwardly extending peripheral rim at the open end of said second feed bowl; and,
  (ii) a plurality of wedge-shaped tabs disposed at spaced intervals on the exterior surface of the peripheral side wall of said first feed bowl, each of said tabs including an upper end and a lower end, the upper end merging with said exterior surface, the lower end extending downwardly from the lower part of said exterior surface for engaging the under side of said flange to releasably secure said second feed bowl to said first bowl in said inverted position as a closely covering cover over said first feed bowl.

2. A pair of feed bowls as defined in claim 1, wherein said tabs are integral with said first feed bowl.

3. A pair of feed bowls as defined in claim 1, wherein the peripheral side wall of said second feed bowl includes an outer surface, a portion of which is peripherally corrugated so as to impart greater flexibility to the peripheral side wall of said second feed bowl, said portion being disposed substantially away from said bottom wall.

* * * * *